United States Patent [19]
Richter et al.

[11] 3,969,263
[45] July 13, 1976

[54] METHOD OF PRODUCING LIGHT USING CATALYST CHEMILUMINESCENT SYSTEM

[75] Inventors: Herbert P. Richter; Carl A. Heller, both of China Lake; Ruth E. Tedrick, Ridgecrest, all of Calif.

[73] Assignee: The United States of America as represented by the Secretary of the Navy, Washington, D.C.

[22] Filed: Mar. 3, 1975

[21] Appl. No.: 554,360

[52] U.S. Cl. .................... 252/186; 252/188.3 CL
[51] Int. Cl.² ................................... C01B 13/00
[58] Field of Search .................. 252/188.3 CL, 186

[56] References Cited
UNITED STATES PATENTS
3,511,612  5/1970  Kennerly et al. .......... 252/188.3 CL Primary Examiner—Stephen J. Lechert, Jr.
Attorney, Agent, or Firm—R. S. Sciascia; Roy Miller; Lloyd E. K. Pohl

[57] ABSTRACT

Tetraalkylammonium trifluoroacetates, lithium trifluoroacetate and sodium trifluoroacetate are disclosed as being useful as catalysts in chemiluminescent systems wherein a hydrogen peroxide component and an oxalate ester-fluorescer component are mixed and reacted to produce light.

3 Claims, No Drawings

METHOD OF PRODUCING LIGHT USING CATALYST CHEMILUMINESCENT SYSTEM

BACKGROUND OF THE INVENTION

1. Field of the Invention.

This invention relates to catalysts for chemiluminescent systems. More particularly, this invention relates to catalysts for two component chemiluminescent systems wherein one component is a hydrogen peroxide component and the other component is an oxalate ester-fluorescer component.

2. Description of the Prior Art.

Two component chemiluminescent systems which utilize a reaction mixture of a hydrogen peroxide component and an oxalate ester-fluroescer component to produce light are well known. In such systems, a solution of hydrogen peroxide in dimethyl phthalate or a mixture of dimethyl phthalate and t-butyl alcohol and a solution of an oxalate ester, for example, bis(2,4,5-trichlorocarbobutoxyphenyl)oxalate, and a fluorescer, for example, 9,10-diphenyl anthracene, in a solvent such as dibutyl phthalate are mixed and allowed to react whereupon light is produced.

In two component chemiluminescent systems of the type described, a catalyst is generally included as part of the hydrogen peroxide component. Many catalysts have been tried. Of the catalysts tried, sodium salicylate and various tetraalkylammonium salicylates have been the most widely used.

Sodium salicylate and tetraalkylammonium salicylates are excellent catalysts for chemiluminescent systems of the type described. However, they have certain disadvantages. First, they are not highly soluble in dimethyl phthalate or in mixtures of dimethyl phthalate and t-butyl alcohol which are the most commonly used solvents for the hydrogen peroxide component. Because of their relatively low solubility, systems which will produce short duration, high intensity light cannot be produced. Short duration, high intensity light systems require fairly large concentrations of catalyst. Second, even at relatively low concentrations, sodium salicylate and the tetraalkylammonium salicylates tend to precipitate out of dimethyl phthalate and mixtures of dimethyl phthalate and t-butyl alcohol at low temperatures. This is obviously undesirable when one realizes that chemiluminescent devices must sometimes be stored at low temperatures prior to use.

SUMMARY OF THE INVENTION

It has now been found that lithium trifluoroacetate, sodium trifluoroacetate and various tetraalkylammonium trifluoroacetates such as tetramethylammonium trifluoroacetate are excellent catalysts for hydrogen peroxide/oxalate ester-fluorescer chemiluminescent systems. The catalysts of this invention are much more soluble in the commonly used solvents for the hydrogen peroxide component (dimethyl phthalate or mixtures of dimethyl phthalate and t-butyl alcohol) than are previously used catalysts and systems which produce approximately 50% more light per liter can be manufactured by utilizing the catalysts of this invention in lieu of the most widely used prior art catalysts.

DESCRIPTION OF THE PREFERRED EMBODIMENT

In tests, a series of chemiluminescent systems of the type described above in which the catalyst was either sodium salicylate or a tetraalkylammonium salicylate dissolved to the maximum, i.e., saturated, in the solvent of the hydrogen peroxide component were compared with a series of chemiluminescent systems in which a member of the group consisting of tetramethylammonium trifluoroacetate, lithium trifluoroacetate and sodium trifluoroacetate was used to replace the salicylate catalysts. The trifluoroacetates were used in concentrations ranging from 0.0001 to 0.1 molar. In every case, the systems utilizing the trifluoroacetate catalysts gave on the order of 50% more light per unit volume of solution than did similar systems utilizing the salicylate catalysts. In addition, since from 10 to 100 times more of the trifluoroacetate catalysts could be dissolved in the dimethyl phthalate or dimethyl phthalate t-butyl alcohol solvent of the hydrogen peroxide component, systems which produced short duration light of very high intensity could be produced. Peak luminesence of on the order of 5000 lumens per liter were achieved with the trifluoroacetate catalysts.

In the Description of the Prior Art above, chemiluminescent systems utilizing hydrogen peroxide, bis(2,4,5-trichlorocarbobutoxyphenyl)-oxalate as the oxalate ester and 9,10-diphenyl antracene as the fluorescer have been specifically mentioned. The catalysts of this invention work equally well when the above-named oxalate ester is replaced with other commonly used oxalate esters such as bis(2,4,5-trichlorocarbopentoxyphenyl)oxalate, etc. and when the above-named fluorescer is replaced with other commonly used fluorescers such as 9,10-bis(phenylethynyl)anthracene, 2-ethyl-9,10-(bis)(phenylethynyl)anthracene, etc.

In addition to the tetramethylammonium trifluoroacetate named above, other tetraalkylammonium trifluoroacetates can be used. For example, the tetraethyl, tetrapropyl and tetrabutyl derivatives may be used.

What is claimed is:

1. In a method for producing light comprising bringing a hydrogen peroxide component containing a catalyst and an oxalate ester-fluorescent component together and allowing said components to react to produce said light, the improvement residing in utilizing, as said catalyst, a member selected from the group consisting of tetraalkylammonium trifluoroacetate wherein the alkyl groups contain from 1 to 4 carbon atoms, lithium trifluoroacetate and sodium trifluoroacetate.

2. A method according to claim 1 wherein the concentration of said catalyst in said hydrogen peroxide component is in the range of from 0.0001 to 0.1 molar.

3. A method according to claim 2 wherein said tetraalkylammonium trifluoroacetate is tetramethylammonium trifluoroacetate.

* * * * *